(12) United States Patent
Xuan

(10) Patent No.: US 8,125,807 B2
(45) Date of Patent: Feb. 28, 2012

(54) TRANSFORMERLESS PHOTOVOLTAIC GRID-CONNECTING INVERTING DEVICE AND CONTROL METHOD THEREOF

(76) Inventor: Kun Xuan, Shanghai (CN)

( * ) Notice: Subject to any disclaimer, the term of this patent is extended or adjusted under 35 U.S.C. 154(b) by 0 days.

(21) Appl. No.: 12/815,916

(22) Filed: Jun. 15, 2010

(65) Prior Publication Data

US 2010/0246223 A1 Sep. 30, 2010

Related U.S. Application Data

(63) Continuation of application No. PCT/CN2008/071185, filed on Jun. 4, 2008.

(30) Foreign Application Priority Data

May 15, 2008 (CN) .......................... 2008 1 0037427

(51) Int. Cl.
*H02M 7/487* (2007.01)

(52) U.S. Cl. .......... 363/95; 363/56.01; 323/906; 361/67

(58) Field of Classification Search ............... 363/56.01, 363/43, 95, 97, 55, 56.02; 323/906, 266; 361/67, 68–69; 700/292–294; 307/126
See application file for complete search history.

(56) References Cited

U.S. PATENT DOCUMENTS 6,320,769 B2 * 11/2001 Kurokami et al. ......... 363/56.03
(Continued)

FOREIGN PATENT DOCUMENTS

CN 1877951 12/2006
(Continued)

OTHER PUBLICATIONS

Johanna Myrzik and Martina Calais, String and Module Integrated Inverters for Single-Phase Grid Connected Photovoltaic Systems—A Review, Jun. 2003, Power Tech Conference Proceedings, 2003 IEEE Bologna, vol. 2, pp. 1-8.*

(Continued)

*Primary Examiner* — Harry Behm
(74) *Attorney, Agent, or Firm* — Hamre, Schumann, Mueller & Larson, P.C.

(57) ABSTRACT

The present invention relates to a transformerless photovoltaic grid-connecting inverting device and an inverting control method thereof. The inverting device comprising a boosting unit, an inverting unit, a grid-connecting unit and a control unit. The boosting unit is connected to a solar cell, for boosting an output voltage of the solar cell and then outputting a direct voltage. The inverting unit is used to convert the direct voltage output by the boosting unit into an alternating voltage. The grid-connecting unit is connected between the inverting unit and an alternating power grid, and closes or breaks up the electrical connection between the inverting unit and the alternating power grid based on a control signal. The control unit is connected to the grid-connecting unit and the inverting unit, and determines a drive signal output to the inverting unit and a grid-connecting signal output to the grid-connecting unit based on the direct voltage and the alternating voltage and phase of the power grid, wherein the phase of the drive signal is synchronous with the phase of the alternating current in the power grid. Therefore, the present invention achieves an inverting device which has a low cost and increased efficiency and safety.

5 Claims, 5 Drawing Sheets

U.S. PATENT DOCUMENTS

| | | | |
|---|---|---|---|
| 6,380,719 B2 * | 4/2002 | Underwood et al. | 322/36 |
| 6,570,272 B2 * | 5/2003 | Dickhoff | 307/113 |
| 6,914,418 B2 | 7/2005 | Sung | |
| 6,930,868 B2 * | 8/2005 | Kondo et al. | 361/42 |
| 2008/0304301 A1 * | 12/2008 | Nishio et al. | 363/132 |

FOREIGN PATENT DOCUMENTS

| | | |
|---|---|---|
| CN | 1877975 | 12/2006 |
| CN | 1885706 | 12/2006 |
| CN | 101026305 | 8/2007 |
| CN | 101051793 | 10/2007 |
| CN | 100347928 | 11/2007 |
| CN | 101083399 | 12/2007 |
| JP | 2004187362 A * | 7/2004 |

OTHER PUBLICATIONS

International Search Report of PCT/CN2008/071185, dated Feb. 26, 2009 (8 pages total).

Han et al., "Power Quality Standard Consideration for the Connection of Distributed Generation to Main Grid." Electrical Equipment, 2007, vol. 8, No. 1. pp. 57-60 (with English language abstract).

* cited by examiner

TRANSFORMERLESS PHOTOVOLTAIC GRID-CONNECTING INVERTING DEVICE AND CONTROL METHOD THEREOF

TECHNICAL FIELD

The present invention belongs to the field of electric power generation by new energy resources. More particularly, the present invention relates to a device for converting a direct current generated by solar cells into an alternating current and transmitting the current to a power grid, and a control method thereof, which is suitable for various solar grid-connected electric power generation systems.

BACKGROUND ART

The inverters presently available on the market can be divided into two types according to their output waveforms: one of non-pure sine wave inverters, and the other of pure sine wave inverters. The non-pure sine wave inverters include square wave inverters, quasi sine wave inverters and etc.. The non-pure sine wave inverters can only apply to a resistive load, and will cause damage to the load and the inverter itself if it applies to an inductive load, a capacitive load, a rectification and filtering load. Therefore, this type of inverters only exist on the low-side market, and cannot be used in most instances.

The pure sine wave inverters are suitable for various types of loads. Moreover, if the amplitude and phase of its output signal is controlled to some extent, the output signal can be transmitted to a power grid (for example, a commercial power grid) so as to achieve a grid-connection. The pure sine wave inversion can be divided into three types according to their inverting solutions. The first type comprises a power frequency transformer solution, which is the earliest inverting solution and which requires a massive transformer, having a large volume, a heavy weight, a high cost and a low efficiency. The second type comprises a high frequency transformer solution, which only requires a smaller high frequency transformer, having improvement on volume, weight and efficiency, but no substantial improvement on cost because of its complex electric circuit.

In order to reduce the cost of the solar electric power generation system so as to make it popular, it is relatively desired to use a transformerless solution, which requires no transformer and is highly improved on volume, weight and cost. Moreover, in the solar electric power generation system, the cost of the solar cell is quite high, thus the efficiency of the inverter should be further increased. In addition, if the solar electric power generation system is grid-connected, many devices such as storage batteries can be omitted, so as to further reduce the cost of the system. If so, it is necessary for the amplitude and phase of the output signal of the electric power generation system to be controlled so as to be consistent with the inherent alternating current signal in the power grid. Since the transformerless solution does not achieve isolation between the electric power generation system and the power grid, safety of the transformerless solution is quite important for the transformerless grid-connection.

Therefore, it is a common desire in the art to design a transformerless, high-efficiency, high-safety solar grid-connecting inverting device.

DISCLOSURE OF THE INVENTION

An object of the present invention is to provide a transformerless solar grid-connecting inverting device, which has the characters of a low cost, a high efficiency, a small volume, etc.

Another object of the present invention is to provide an inverting control method of a transformerless solar grid-connecting inverting device, so that the inverting process has higher efficiency, and safety.

One embodiment of the present invention provides a transformerless photovoltaic grid-connecting inverting device comprising a boosting unit, an inverting unit, a grid-connecting unit and a control unit. The boosting unit is connected to a solar cell, for boosting an output voltage of the solar cell and then outputting a direct voltage. The inverting unit is connected to the boosting unit, for converting the direct voltage output by the boosting unit into an alternating voltage. The grid-connecting unit is connected between the inverting unit and an alternating power grid, and closes or breaks up the electrical connection between the inverting unit and the alternating power grid based on a control signal. The control unit is connected to the grid-connecting unit and the inverting unit, samples the direct voltage of the boosting unit and the alternating voltage and phase of the alternating power grid, and determines a drive signal output to the inverting unit and a grid-connecting signal output to the grid-connecting unit based on the direct voltage and the alternating voltage and phase of the power grid, wherein the phase of the drive signal is synchronous with the phase of the alternating current in the power grid.

In the above transformerless photovoltaic grid-connecting inverting device, the boosting unit comprises: an inductor, one end of which is connected to one output end of the solar cell; a freewheeling diode, the anode end of which is connected to the other end of the inductor; a power tube, one end of which is connected to the other end of the inductor and the other end of which is connected to the other output end of the solar cell, wherein a control end of the power tube is controlled by a switching signal having an adjustable duty ratio so as to be turned on or off, and the cathode end of the freewheeling diode outputs said direct voltage.

In the above transformerless photovoltaic grid-connecting inverting device, the control unit comprises: a set of sampling circuits, which sample the direct voltage of the boosting unit and the alternating voltage and phase of the alternating power grid; a control chip, which determines the drive signal output to the inverting unit and the grid-connecting signal output to the grid-connecting unit based on the direct voltage and the alternating voltage and phase of the power grid; and a set of driving circuits, which amplify the power of the drive signal and the grid-connecting signal and output the drive signal and the grid-connecting signal to the inverting unit and the grid-connecting unit respectively.

In the above transformerless photovoltaic grid-connecting inverting device, the inverting unit comprises: a first power tube, a second power tube, a third power tube and a fourth power tube, which are connected in turn between the two output ends of said boosting unit; a first capacitor and a first diode, which are connected in series between one output end of the boosting unit and the connecting point of the first power tube and the second power tube; a second capacitor and a second diode, which are connected in series between the other output end of the boosting unit and the connecting point of the third power tube and the fourth power tube; a filtering inductor, one end of which is connected to the connecting point of the second power tube and the third power tube, and the other end of which is connected to the grid-connecting circuit; wherein the second power tube and the third power tube are respectively controlled so as to be turned on and off alternately at a frequency of the power grid; when the second power tube is turned on, the first power tube is turned on and off continuously at a frequency that is 100~200 times higher than the frequency of the power grid; when the second power tube is turned off, the first power tube is also turned off; when the third power tube is turned on, the fourth power tube is turned on and off continuously at a frequency that is 100~200 times higher than the frequency of the power grid; and when the third power tube is turned off, the fourth power tube is also turned off; wherein the first power tube, the second power tube, the third power tube and the fourth power tube are driven by the drive signal output from the control unit via the set of driving circuits.

In the above transformerless photovoltaic grid-connecting inverting device, the control unit further monitors the maximum output power of the solar cell based on the direct voltage of the boosting unit, thereby adjusting the grid-connecting power, wherein if the direct voltage is within the stabilized voltage range, the grid-connecting power will be -increased and if the direct voltage is below the stabilized voltage range, the grid-connecting power will be decreased.

Another embodiment of the present invention provides an inverting control method of a transformerless photovoltaic grid-connecting inverting device. The inverting device comprising: a boosting unit connected to a solar cell, for boosting an output voltage of the solar cell and then outputting a direct voltage; an inverting unit connected to the boosting unit, for converting the direct voltage output by the boosting unit into an alternating voltage; a grid-connecting unit connected between the inverting unit and an alternating power grid, which closes or breaks up the electrical connection between the inverting unit and the alternating power grid based on a grid-connecting signal; and a control unit connected to the inverting unit and the grid-connecting unit, which controls the operation of the inverting unit and the grid-connecting unit; wherein the inverting control method comprises the following steps:

a) the control unit samples the direct voltage of the boosting unit and the voltage and phase of the alternating power grid;

b) the control unit determines whether the direct voltage and the voltage and phase of the alternating power grid are normal, and if any of the parameters is abnormal, the method returns to the step a), otherwise the method continues to the step c);

c) the control unit outputs a drive signal to the inverting unit, so as to cause the inverting from a direct current to an alternating current to begin, wherein the phase of the drive signal is synchronous with the phase of the alternating current in the power grid;

d) the control unit controls the grid-connecting unit to close the electrical connection between the inverting unit and the alternating power grid, so that the alternating current produced by the inverting unit is coupled to the alternating power grid; and e) during the grid-connecting, the control unit performs a maximum power point tracking step which monitors the maximum output power of the solar cell, thereby adjusting the grid-connecting power.

In the above inverting control method of a transformerless photovoltaic grid-connecting inverting device, it further comprises the following steps:

f) the control unit continues to sample the direct voltage of the boosting unit and the voltage and phase of the alternating power grid; and g) the control unit determines whether the direct voltage and the voltage and phase of the alternating power grid are normal, and if any of the parameters is abnormal, the control unit disconnects the electrical connection between the inverting unit and the alternating power grid and stops the inverting of the inverting unit, and the method returns to the step a).

In the above inverting control method of a transformerless photovoltaic grid-connecting inverting device, the maximum power point tracking step in the step e) comprises:

determining whether the direct voltage of the boosting unit is within the stabilized voltage range, wherein if the direct voltage is within the stabilized voltage range, the grid-connecting power will be increased and if the direct voltage is below the stabilized voltage range, the grid-connecting power will be decreased.

In the above inverting control method of a transformerless photovoltaic grid-connecting inverting device, the step of increasing and decreasing the grid-connecting power comprises increasing and decreasing the duty ratio of the drive signal.

In the above inverting control method of a transformerless photovoltaic grid-connecting inverting device, it further comprises a step before the step of increasing the grid-connecting power: determining whether the grid-connecting power achieves the maximum output power, wherein if the grid-connecting power has increased to the maximum output power, the grid-connecting power will not be increased any more.

The present invention, due to the adoption of the above technical solutions, allows a smaller volume, a lighter weight and a decreased cost as compared with the prior art, and the pure sine wave produced the present invention will not cause damage to the power grid due to high-efficiency harmonic wave, making the grid-connected power generation be possible. Moreover, the maximum power point tracking method of present invention comprises changing the output power of the grid-connecting unit and monitoring the output voltage of the boosting unit by the control unit. This maximum power point tracking method only needs to track one voltage value, so as to avoid any complex calculation and comparison.

BRIEF DESCRIPTION OF THE DRAWINGS

In order to make the above objects, features and advantages clearer and easier to understand, particular embodiments of the present invention are discussed in detail with reference to the figures, wherein.

BEST MODE FOR CARRYING OUT THE INVENTION

Figure 1:
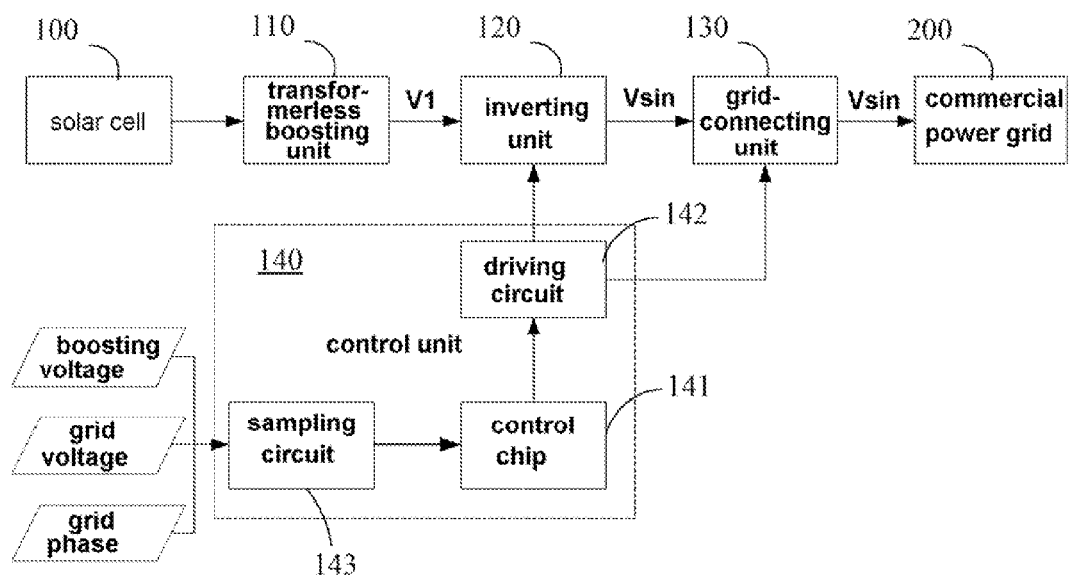
FIG. 1 is a structure diagram of a transformerless photovoltaic grid-connecting inverting device according to one embodiment of the present invention.

With reference to FIG. 1, a transformerless solar grid-connecting inverting device 10 according to one embodiment of the present invention comprises a transformerless boosting unit 110, an inverting unit 120, a grid-connecting unit 130 and a control unit 140. The boosting unit 110 is connected to a solar cell 100, the inverting unit 120 is connected to the boosting unit 110 and the grid-connecting unit 130 is connected between the inverting unit 120 and a commercial power grid 200. The control unit 140 comprises a control chip 141, a set of sampling circuits 142 (one sampling circuit is illustratively shown in the figure) and a set of driving circuits 143 (one driving circuit is illustratively shown in the figure) which are connected to the control chip 141 respectively.

Figure 2:
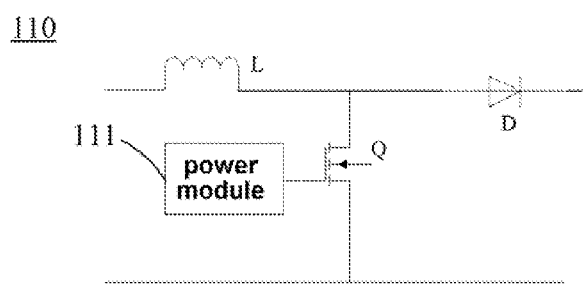
FIG. 2 is a circuit diagram of a transformerless boosting unit according to one embodiment of the present invention.

With reference to FIG. 2, the boosting unit 110 is a circuit without a transformer, which is composed of a power tube Q, an inductor L, a freewheeling diode D and a power module 111 for controlling the power tube Q. The power module 111 applies a switching signal to the power tube Q, and an input voltage V0 of the solar cell coupled to an end of the inductor L is converted into a voltage V1 output from the cathode end of the freewheeling diode D by switching the power tube Q. The detailed process is as follows: when the power tube Q is turned on, the current of the inductor L is increased so as to store energy; when the power tube Q is turned off, the current of the inductor L is output from the freewheeling diode D so that the current is decreased. Continuously switching the power tube Q can cause the circuit to produce a direct current output voltage V1. The ratio between the output voltage V1 and the input voltage V0 can be determined by the on-off time ratio of the power tube Q, that is:

$$V1 = (1 + Ton/Toff) \times V0,$$

wherein Ton is the on time of the power tube in each period, and Toff is the off time of the power tube in each period.

Figure 3:
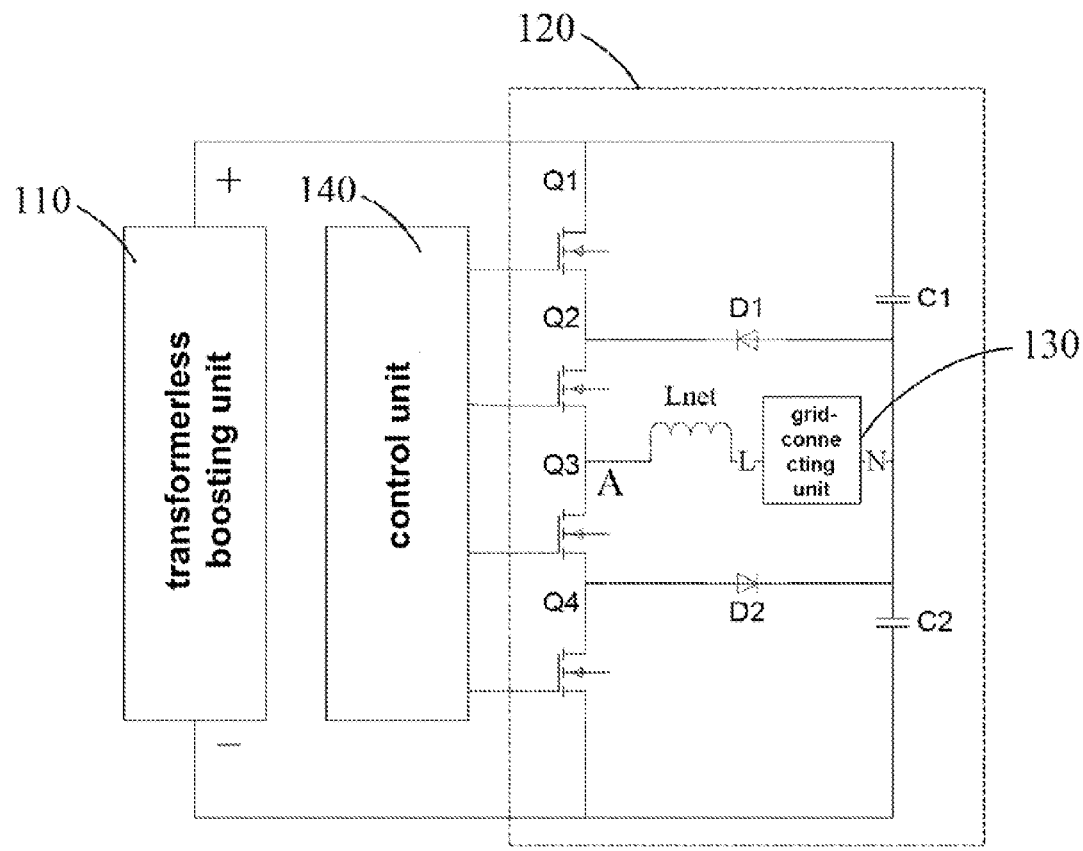
FIG. 3 is a circuit diagram of an inverting unit according to one embodiment of the present invention.

The output voltage V1 of the boosting unit 110 enters the inverting unit 120 for inverting the direct current to the alternating current. In one embodiment, the inverting unit 120 is composed of four IGBTs, two freewheeling diodes D1 and D2, two electrolytic capacitors C1 and C2 and a lowpass filtering inductor Lnet, as shown in FIG. 3. The switching of the four power tubes Q1~Q4 is controlled by the control unit 140. The second and third power tubes Q2 and Q3 are controlled respectively to be on and off alternately at a frequency (such as 50 Hz or 60 Hz) of the power grid. When the second power tube Q2 is turned on, the first power tube Q1 is turned on and off continuously at a frequency that is 100~200 times higher than the frequency of the power grid; and when the second power tube Q2 is turned off, the first power tube Q1 is also turned off. Similarly, when the third power tube Q3 is turned on, the fourth power tube Q4 is turned on and off continuously at a frequency that is 100~200 times higher than the frequency of the power grid; and when the third power tube Q3 is turned off, the fourth power tube Q4 is also turned off. In this manner, the circuit can output an alternating voltage, the frequency of which is consistent with the frequency of the power grid.

Figure 4:
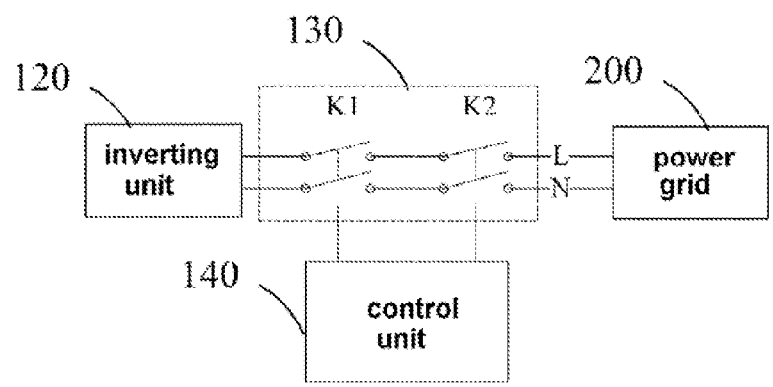
FIG. 4 is a circuit diagram of a grid-connecting unit according to one embodiment of the present invention.
Figure 5:
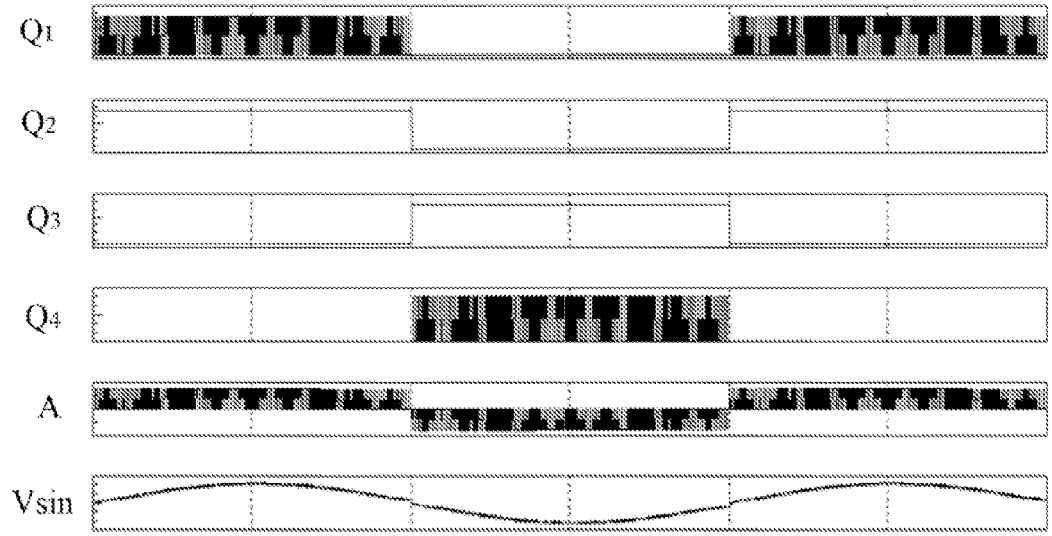
FIG. 5 is a waveform diagram of various portions of the inverting unit of FIG. 3.

As shown in FIG. 5, the former four waveforms in turn are drive waveforms of power tubes Q1, Q2, Q3 and Q4. In the figure, a high level means that the power tube is turned on, and a low level means that the power tube is turned off. As mentioned above, the power tubes Q2 and Q3 are turned on alternately at a low frequency. When the power tube Q2 is turned on, the power tube Q1 is turned on and off at a high frequency. When the power tube Q3 is turned on, the power tube Q4 is turned on and off at a high frequency. In this manner, the waveform at the connecting point A of the power tubes Q2, Q3 and inductor Lnet is the waveform VA as shown in FIG. 4. In one embodiment, the high level of the waveforms is 350V, the low level is −350V, and the medium value is 0V.

By the filtering of the inductor Lnet, the high-frequency portions in the waveform VA are filtered off, so that a sine waveform Vsin is obtained at the end L of the grid-connecting circuit, as shown in FIG. 4.

Figure 6:
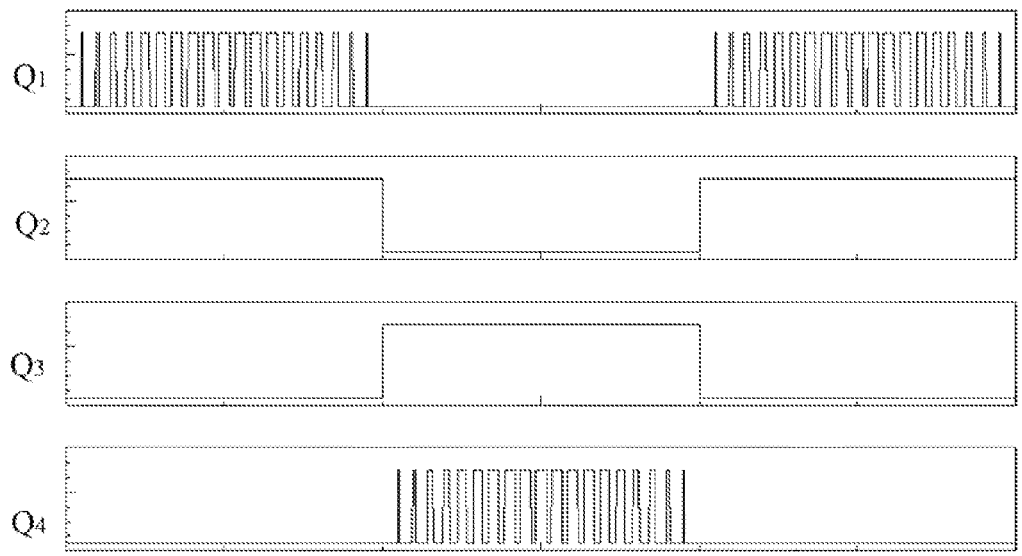
FIG. 6 is a waveform diagram of Q1~Q4 of FIG. 5 after lowering of their frequency.

Since the ratio of the high frequency to the low frequency in FIG. 5 is too high, it is hard to see the high-frequency waveform clearly. Therefore, the waveforms as shown in FIG. 6 are obtained by reducing the frequency of high-frequency drive waves in Q1~Q4 to one sixth. For each periodic time of the high-frequency wave, the periodic time is the same, but the on-off time ratio (that is, the duty ratio) is different. The duty ratio varies from small to large and then from large to small, and the rule of the variation follows the rule of a sine wave. In this manner, after the high-frequency portions have been filtered off by the inductor Lnet, the remaining low-frequency portions just compose a sine wave.

The above sine wave Vsin is transmitted to the commercial power grid 200 via the grid-connecting unit 130, wherein the grid-connecting unit 130 can control the opportunity at which the sine wave Vsin is coupled to the power grid. With reference to FIG. 6, one embodiment of the grid-connecting unit 130 comprises two relays K1 and K2, wherein the switching of the relays K1 and K2 is controlled by the control unit 140. When both of the two relays K1 and K2 are closed, the output (that is, the sine wave Vsin) of the inverting device 10 is connected to the power grid 200. When either of the two relays K1 and K2 is disconnected, the inverting device 10 is disconnected from the power grid 200.

Although the frequency of the sine wave Vsin can caused to be consistent with that of the commercial power grid in the inverting unit 120, the phase of the sine wave Vsin transmitted to power grid 200 should further be the same as that of the commercial alternating current signal in the power grid, which is achieved by controlling the switching of the grid-connecting unit 130. In addition, since the inverting device 10 contains no isolation by a transformer, the grid-connecting unit 130 has a function of isolation, so as to protect the inverting device 10 from any abnormality of the power grid, and vice versa.

It is required to monitor the parameters such as the output voltage of the boosting unit and the voltage and phase of the alternating power grid in order to achieve the above function of grid-connecting, which is achieved by the control unit 140. The control unit 140 comprises a control chip 141, a set of sampling circuits 142 (one sampling circuit is illustratively shown in the figure) and a set of driving circuits 143 (one driving circuit is illustratively shown in the figure). The control chip 141 is the core of the control unit 140, for controlling the operation of the inverting unit 120 and the grid-connecting unit 130.

Figure 7:
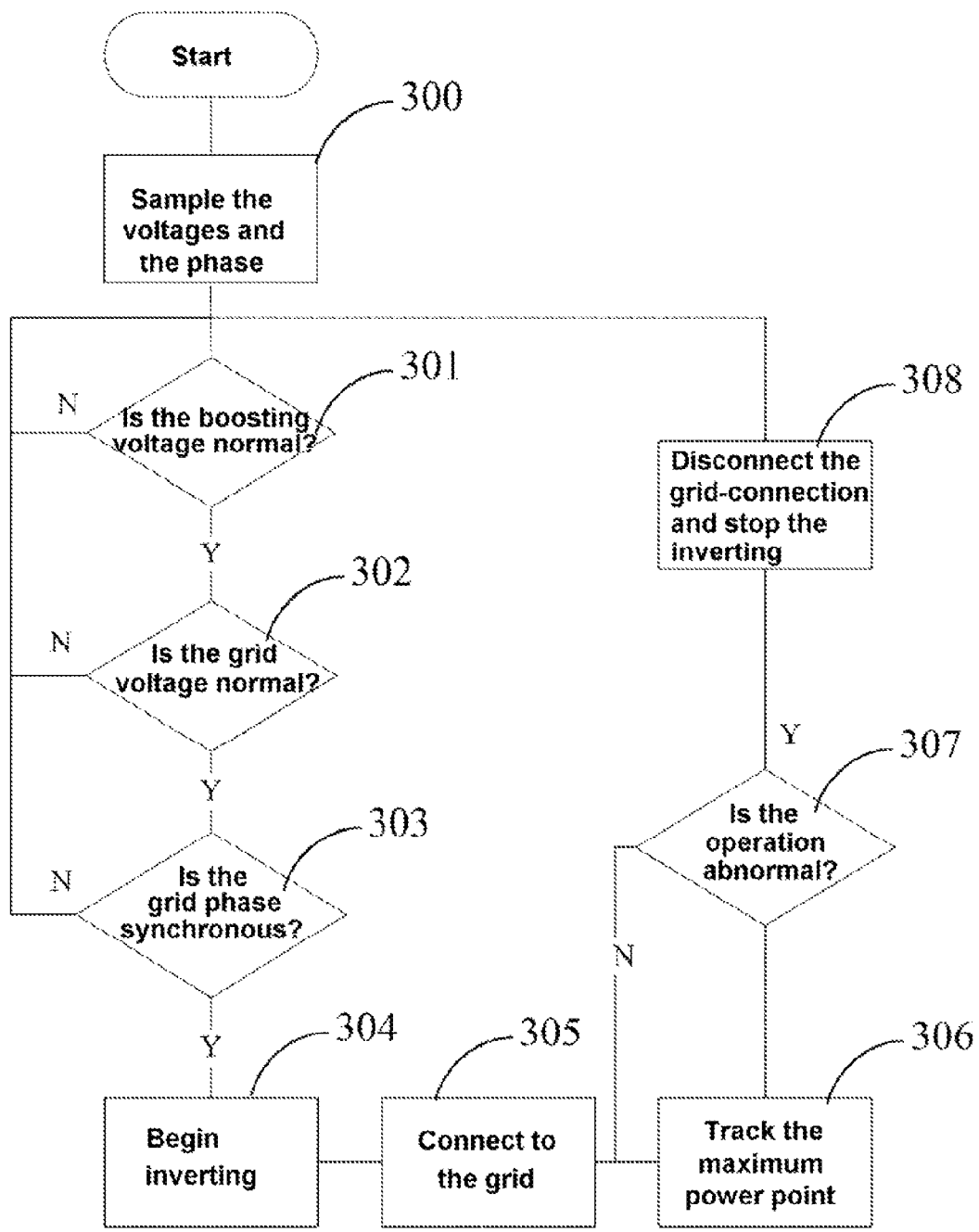
FIG. 7 is a control flow diagram of a control unit according to one embodiment of the present invention.

With reference to FIG. 7, the control process of the control unit 140 comprises the following steps:

At step 300, the parameters such as the output voltage V1 of the boosting unit 110 and the voltage and the phase of the alternating power grid 200 are sampled and transmitted to the control chip 141.

At step 301-303, the control chip 141 determines whether these parameters are normal. For example, it determines whether the output voltage V1 is within the set range (such as 650-750V), whether the voltage of the alternating power grid is within the set range (such as 200-240V) and whether noises exist in the signal of the alternating power grid so that the phase is caused to be abnormal. If the parameters are normal, the process continues. As long as one of the parameters is abnormal, the process returns to the step 301 and checks these parameters again until these parameters are normal.

Next, at step 304, the drive signals required by the inverting unit 120 are transmitted to the driving circuit 143 by the control chip 141, then amplified by the driving circuit 143, so as to produce drive signals for controlling the four power tubes Q1~Q4 in the inverting unit 120 so that the inverting begins. The inverting process is discussed in the above, so that the description thereof is omitted herein. The phase of these drive signals is synchronous with that of the power grid, so that the phase of the sine wave produced after inverting is synchronous with that of the power grid.

Next, at step 305, a grid-connecting signal is output by the control chip 141 and amplified by the driving circuit 143, and then with the two grid-connecting relays K1 and K2 of the grid-connecting unit are controlled to be closed, the output signal Vsin of the inverting unit 120 is coupled to the power grid 200, so that the generated electric power is connected to the grid.

During the grid-connection, the control unit 140 monitors the maximum power output by the solar cell 100, which is referred herein as maximum power point tracking, as shown in step 306. The detailed process of the maximum power point tracking will be discussed hereinafter.

Then, the control chip 140 continues to receive the parameters such as the output voltage of the boosting unit 110 and the voltage and phase of the alternating power grid 200 which are sampled by the sampling circuit 142, and checks whether these parameters are abnormal, as shown in step 307. As soon as any abnormality of these parameters is found, the grid-connection is disconnected and the inverting is stopped (step 308) and then the process returns to step 301.

During the electric power generation of the solar cell, it is desired to increase the grid-connected output power so as to fully utilize the output power of the solar cell 100. For this end, the control unit 140 performs the step of maximum power point tracking.

Figure 8:
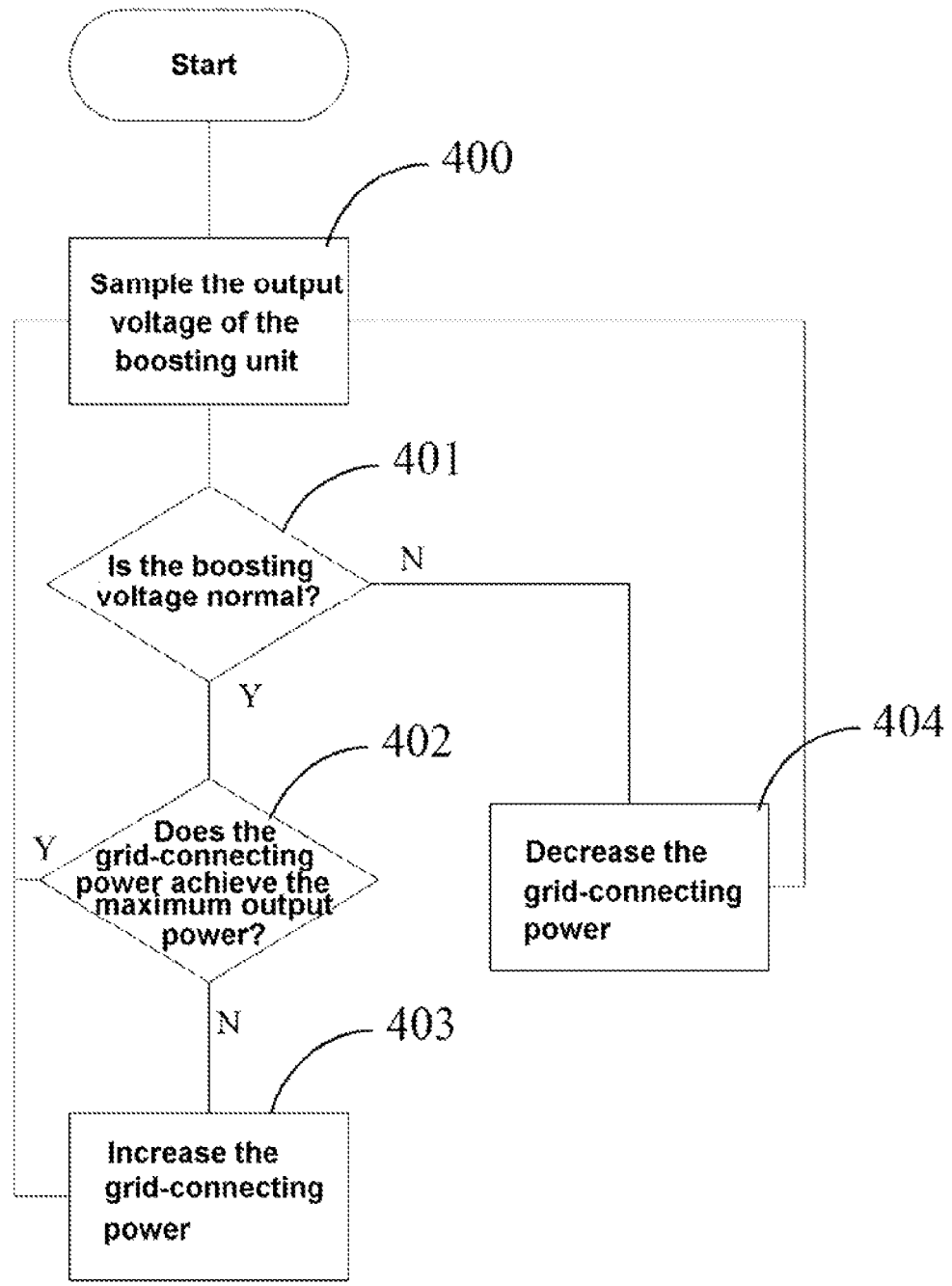
FIG. 8 is a flow diagram of a maximum power point tracking method of the control unit according to one embodiment of the present invention.

The character of the maximum power point tracking method is that the boosting unit 110 only stabilizes the voltage, but does not track the maximum power point, while the control unit 140 is in charge of the tracking of the maximum power point. It has a benefit that the boosting unit 110 is completely not controlled by the control unit 140, and composes a functionally independent unit itself. As shown in FIG. 8, the steps of maximum power point tracking are as follows:

At step 400, the output voltage V1 of the boosting unit 110 is sampled and transmitted to the control chip 141 by the sampling circuit 142 in the control unit 140.

At step 401, it determines whether the output voltage V1 of the boosting unit is within the stabilized voltage range. If the output voltage V1 of the boosting unit 110 is within the stabilized voltage range, which means that the output power of the inverting device 10 is lower than the maximum power of the solar cell 100, the grid-connecting power will be increased (step 403) by increasing the duty ratio of the controlled signals of power tubes Q2 and Q3; if the output voltage V1 of the boosting unit 110 is below the stabilized voltage range, which means that the output power of the solar cell is fully utilized and it is the maximum power point of the solar cell 100, the grid-connecting power will be decreased (step 404).

Before increasing the grid-connecting power, it further determines whether the grid-connecting power achieves the maximum output power (step 402). If the grid-connecting power is increased to the maximum output power and the output voltage V1 is still within the stabilized voltage range, the grid-connecting power will not be increased and the process directly returns to step 400 and repeats the above procedures continuously.

In conclusion, the above embodiment of the present invention has following advantages:

The present invention utilizes a tranformerless inverting circuit, which allows a smaller volume, a lighter weight and a decreased cost, and the pure sine wave produced by which will not cause damage to the power grid due to high-frequency harmonic wave, making the grid-connected power generation be possible. Moreover, the maximum power point tracking method of present invention comprises changing the output power of the grid-connecting unit and monitoring the output voltage of the boosting unit by the control unit. This kind of method of obtaining maximum power point tracking only needs to track one voltage value, so as to avoid any complex calculation and comparison.

Although the present invention is disclosed as above by the preferred embodiment, it is not intended to thus limit the present invention. Those skilled in the art can make some amendment and improvement without departing from the spirit and scope of the invention. Therefore, the protection scope of the present invention should be defined by the claims.

The invention claimed is:

1. A transformerless photovoltaic grid-connecting inverting device comprising:
   a boosting unit connected to a solar cell, for boosting an output voltage of the solar cell and then outputting a direct voltage;
   an inverting unit connected to the boosting unit, for converting the direct voltage output by the boosting unit into an alternating voltage;
   a grid-connecting unit connected between the inverting unit and an alternating power grid, which includes, two serially connected relays, each relay connects or disconnects the electrical connection between the inverting unit and the alternating power grid based on a control signal; and
   a control unit connected to the grid-connecting unit and the inverting unit, which samples the direct voltage of the boosting unit and the alternating voltage and phase of the alternating power grid, and determines a drive signal output to the inverting unit and a grid-connecting signal output to the grid-connecting unit based on the direct voltage and the alternating voltage and phase of the power grid, wherein the phase of the drive signal is synchronous with the phase of the alternating current in the power grid,
   wherein the control unit comprises:
      a set of sampling circuits, which sample the direct voltage of the boosting unit and the alternating voltage and phase of the alternating power grid;
      a control chip, which determines the drive signal output to the inverting unit and the grid-connecting signal output to the grid-connecting unit based on the direct voltage and the alternating voltage and phase of the power grid; and
      a set of driving circuits, which amplify the power of the drive signal and the grid-connecting signal and output the drive signal and the grid-connecting signal to the inverting unit and the grid-connecting unit respectively,
   wherein the inverting unit comprises:
      a first power tube, a second power tube a third power tube and a fourth power tube, which are connected in turn between the two output ends of said boosting unit;

a first capacitor and a first diode, which are connected in series between one output end of the boosting unit and the connecting point of the first power tube and the second power tube;

a second capacitor and a second diode, which are connected in series between the other output end of the boosting unit and the connecting point of the third power tube and the fourth power tube; and a filtering inductor, one end of which is connected to the connecting point of the second power tube and the third power tube, and the other end of which is connected to the grid-connecting circuit, wherein the second power tube and the third power tube are respectively controlled so as to be turned on and off alternately at a frequency of the power grid; when the second power tube is turned on, the first power tube is turned on and off continuously at a frequency that is 100~200 times higher than the frequency of the power grid; when the second power tube is turned off, the first power tube is also turned off; when the third power tube is turned on, the fourth power tube is turned on and off continuously at a frequency that is 100~200 times higher than the frequency of the power grid; and when the third power tube is turned off, the fourth power tube is also turned off; and wherein the first power tube, the second power tube, the third power tube and the fourth power tube are driven by the drive signal output from the control unit via the set of driving circuits.

2. The transformerless photovoltaic grid-connecting inverting device according to claim 1, wherein the boosting unit comprises:

an inductor, one end of which is connected to one output end of the solar cell;

a freewheeling diode, the anode end of which is connected to the other end of the inductor;

a power tube, one end of which is connected to the other end of the inductor and the other end of which is connected to the other output end of the solar cell, wherein a control end of the power tube is controlled by a switching signal having an adjustable duty ratio so as to be turned on or off, and the cathode end of the freewheeling diode outputs said direct voltage.

3. The transformerless photovoltaic grid-connecting inverting device according to claim 1, wherein the control unit further monitors the maximum output power of the solar cell based on the direct voltage of the boosting unit, thereby adjusting the grid-connecting power, and wherein if the direct voltage is within the stabilized voltage range, the grid-connecting power will be increased and if the direct voltage is below, the stabilized voltage range, the grid-connecting power will be decreased.

4. The transformerless photovoltaic grid-connecting inverting device according to claim 1, wherein the two serially connected relays are configured such that the inverting unit and the alternating power grid are connected when both relays are connected, and the inverting unit and the alternating power grid are disconnected when either relay is disconnected.

5. A transformerless photovoltaic grid-connecting inverting device comprising:

a boosting-unit connected to a solar cell, for boosting an output voltage of the solar cell and then outputting a direct voltage;

an inverting unit connected to the boosting unit, for converting the direct voltage output by the boosting unit into an alternating voltage;

a grid-connecting unit connected between the inverting unit and an alternating power grid, which connects or disconnects the electrical connection between the inverting unit and the alternating power grid based on a control signal; and a control unit connected to the grid-connecting unit and the inverting unit, which samples the direct voltage of the boosting unit and the alternating voltage and phase of the alternating power grid, and determines a drive signal output to the inverting unit and a grid-connecting signal output to the grid-connecting unit based on the direct voltage and the alternating voltage and phase of the power grid, wherein the phase of the drive signal is synchronous with the phase of the alternating current in the power grid, wherein the control unit comprises:

a set of sampling circuits, which sample the direct voltage of the boosting unit and the alternating voltage and phase of the alternating power grid;

a control chip, which determines the drive signal output to the inverting unit and the grid-connecting signal output to the grid-connecting unit based on the direct voltage and the alternating voltage and phase of the power grid; and a set of driving circuits, which amplify the power of the drive signal and the grid-connecting signal and output the drive signal and the grid-connecting signal to the inverting unit and the grid-connecting unit respectively; and wherein the inverting unit comprises:

a first power tube, a second power tube, a third power tube and a fourth power tube, which are connected in turn between the two output ends of said boosting unit;

a first capacitor and a first diode, which are connected in series between one output end of the boosting unit and the connecting point of the first power tube and the second power tube;

a second capacitor and a second diode, which are connected in series between the other output end of the boosting unit and the connecting point of the third power tube and the fourth power tube; and a filtering inductor, one end of which is connected to the connecting point of the second power tube and the third power tube, and the other end of which is connected to the grid-connecting circuit;

wherein the second power tube and the third power tube are respectively controlled so as to be turned on and off alternately at a frequency of the power grid; when the second power tube is turned on, the first power tube is turned on and off continuously at a frequency that is 100~200 times higher than the frequency of the power grid; when the second power tube is turned off, the first power tube is also turned off; when the third power tube is turned on, the fourth power tube is turned on and off continuously at a frequency that is 100~200 times higher than the frequency of the power grid; and when the third power tube is turned off, the fourth power tube is also turned off; and wherein the first power tube, the second power tube, the third power tube and the fourth power tube are driven by the drive signal output from the control unit via the set of driving circuits.

* * * * *